United States Patent [19]

Mahon

[11] Patent Number: 5,124,828
[45] Date of Patent: Jun. 23, 1992

[54] DEVICE FOR HETERODYNE DETECTION OF AN OPTICAL SIGNAL AND FOR REDUCING NOISE IN THE SIGNAL USING POLARIZATION CONTROL ELEMENTS

[75] Inventor: Cathal J. Mahon, Eindhoven, Netherlands

[73] Assignee: U.S. Philips Corporation, New York, N.Y.

[21] Appl. No.: 741,982

[22] Filed: Aug. 6, 1991

Related U.S. Application Data

[63] Continuation of Ser. No. 601,592, Oct. 18, 1990, abandoned, which is a continuation of Ser. No. 463,019, Jan. 10, 1990, abandoned, which is a continuation of Ser. No. 267,695, Nov. 2, 1988, abandoned, which is a continuation of Ser. No. 40,444, Apr. 20, 1987, abandoned.

[30] Foreign Application Priority Data

Sep. 22, 1986 [NL] Netherlands ............ 8602380

[51] Int. Cl.⁵ .............................. H04B 10/06
[52] U.S. Cl. .................................. 359/192
[58] Field of Search ............................ 359/192

[56] References Cited

U.S. PATENT DOCUMENTS 4,436,376  2/1981  Fergason ............... 455/616
4,752,120  6/1988  Shimizu ................ 455/616

OTHER PUBLICATIONS

Mahon et al, "Compensational Deformation"; New Endless Polarization Matching Control Schemes for Optical Homodyne on Heterodyne Receivers which Require No Mechanical Drivers, 12th Conference of Optical Communications, Tech. Digest, vol. 1 pp. 267–270, Sep. 22–25, 1986.

Noe, "Endless Polarization Control for Heterodyne/Homodyne Receivers" SPIE vol. 630, Fiber Optics '1986 (Apr./May).

Okoshi, "Polarization Control Schemes for Het/Homodyne Optical Fiber Communications" Journal of Lightwave Tech., vol. LT-3, pp. 1232–1237, Dec. 85.

Rysdale, "Method of Overcoming Finite Range Limitation of Certain State of Polarization Control Devices in Automatic Polarization Schemes", Electronic Letters, vol. 22 #2, Jan. 16, 1986 pp. 100–102.

O. E. Delange, "Optical Heterodyne Detection", IEEE Spectrum, Oct. 1968, pp. 77–85.

Noé, "Endless Polarization Control Experiment with Three Elements of Limited Birefringence Range", Electronics Letters, vol. 22 No. 25, 1341–1343. Dec. 1986.

Primary Examiner—Edward L. Coles, Sr.
Assistant Examiner—L. Pascal
Attorney, Agent, or Firm—Anne E. Barschall

[57] ABSTRACT

Device for optical heterodyne detection of an optical signal beam and an optical transmission system provided with such a device. An optical heterodyne detection device is described in which with the aid of three controllable elements (A, B and C), to influence the state of polarization and having a limited control range, such as Faraday rotators or birefringent electro-optical crystals, the state of polarization of radiation originating from a local oscillator (30) is made to correspond to the signal beam transmitted through a long-distance transmission fibre (10).

16 Claims, 10 Drawing Sheets

DEVICE FOR HETERODYNE DETECTION OF AN OPTICAL SIGNAL AND FOR REDUCING NOISE IN THE SIGNAL USING POLARIZATION CONTROL ELEMENTS

This is a continuation of application Ser. No. 07/601,592, filed on Oct. 18, 1990, which is a continuation of Ser. No. 07/463,019, filed on Jan. 10, 1990, which is a continuation of Ser. No. 07/267,695, filed on Nov. 2, 1988, which is a continuation of Ser. No. 07/040,444, filed on Apr. 20, 1987. All four applications are now abandoned.

BACKGROUND OF THE INVENTION

1. Field of the Invention

The invention relates to a device for optical heterodyne detection of an optical signal beam. The device comprises a local oscillator, means for combining local oscillator radiation with signal beam radiation, an opto-electric converter and a plurality of controllable elements to influence the state of polarisation, which elements have a limited control range.

The invention also relates to an optical transmission system provided with such a device.

2. The Prior Art

As compared with direct detection of a signal beam, heterodyne detection provides considerable advantages relating to the signal-to-noise ratio and the discrimination from background radiation. The principle of heterodyne detection for optical radiation has been described extensively in the Article "Optical Heterodyne Detection" by O.E. DeLange in the Journal "IEEE Spectrum" of October 1968, pages 77-85. As stated in this article it is important that the states of polarisation of the modulated signal beam and of the local oscillator beam correspond as much as possible. To achieve this, polarisation control is necessary, because optical transmission systems use optical waveguides or optical fibres, which disturb the state of polarisation of the radiation propagating therein. These fibres, which may be several dozen to several hundred kilometres long, are subjected to uncontrollable external influences such as temperature and pressure variations so that the disturbance of the state of polarisation may vary on time. A signal beam linearly polarised at the input of a transmission fibre will generally be distorted at the output to an elliptically polarised beam whose ellipticity and direction of major axis vary over time.

The Article "Method of overcoming finite-range limitation of certain state of polarisation control devices in automatic polarisation control schemes" by L. J. Rysdale in the Journal "Electronics Letters", Vol. 22, No. 2, 16th Jan. 1986, pages 100-102, proposes a method using four controllable elements to influence the state of polarisation. The elements have a limited range and are arranged one after the other. This leads to a system with which the linearly polarised local oscillator beam is brought to a state of polarisation which corresponds to the state of polarisation of the signal beam. With this system changes in the state of polarization of the signal beam can be followed to an unlimited extent.

SUMMARY OF THE INVENTION

In the known control four controllable elements are required which are arranged in the radiation path of the local oscillator. It is an object of the invention to provide control of the state of polarisation for optical heterodyne detection in which fewer controllable elements are needed to influence the state of polarisation and in which the controllable elements can have limited control range.

To this end a device for optical heterodyne detection according to the invention is characterized in that there are three such controllable elements to influence the state of polarisation. The construction of the detection device and the control circuit required for the control is simpler with fewer controllable elements than in the known state of polarisation control. The invention is based on the recognition that during a deformation cycle there are states of polarisation during which one of the controllable elements can be arbitrarily varied whilst this change can be compensated for by the two other elements.

An embodiment of a detection device according to the invention is characterized in that at least one of the controllable elements used to influence the state of polarisation is a linear birefringent element.

Such an element in the form of an electro-optical crystal reacts rapidly to control signals and has low power consumption.

Another embodiment of the device according to the invention is characterized in that at least one of the controllable elements used to influence the state of polarisation is an element rotating the state of polarisation.

Such an element has the advantage that it can be arranged in the radiation path with small coupling losses and it may be, for example, a Faraday rotator.

Further embodiments of the device according to the invention are characterized in that the three controllable elements to influence the state of polarisation are arranged in the radiation path of either the signal beam or the local oscillator beam, or in that at least one such element is arranged in each of the two radiation paths.

The different possibilities of arranging the elements in the radiation paths provide as many possibilities for the construction of the detection device.

The invention also relates to an optical transmission system provided with a device for optical heterodyne detection in accordance with any one of the preceding embodiments. Such a transmission system has the advantage that modifications in the state of polarisation of the signal beam can be endlessly followed by the state of polarisation of the local oscillator beam with the aid of only three controllable elements to influence the state of polarisation which elements have a limited control range.

BRIEF DESCRIPTION OF THE DRAWING

The invention will now be described with reference to some embodiments. The illustrated examples only show some of the possible configurations and they are considered to give those skilled in the art sufficient information to design other configuration within the scope of the invention. The embodiments are illustrated in the accompanying drawings in which.

DETAILED DESCRIPTION OF THE PREFERRED EMBODIMENTS

Figure 1A:
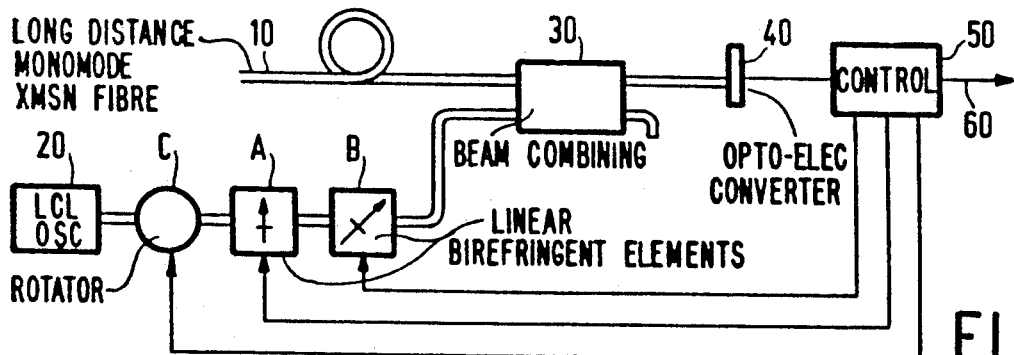
FIGS. 1a, 1b, 1c, and 1d show diagrammatically four possible embodiments of an optical heterodyne detection device according to the invention in which a controllable linear birefringent element having a limited control range is arranged.

In FIG. 1a the reference numeral 10 denotes the last portion of a long-distance monomode transmission fibre. The signal beam propagating through this fibre is mixed in a beam-combining element 30, shown in the Figure as a fibre-optical coupler, with radiation from a local oscillator 20. The radiation emerging from the element 30 is detected by means of an opto-electric converter 40, for example. a photo diode. As described in the above-cited Article "Optical Heterodyne Detection" by O. E. DeLange in the journal "IEEE Spectrum" of October 1968, pages 77-85, the output signal of the opto-electric converter has an a.c. component whose frequency is equal to the difference of the frequencies of the signal beam and the local oscillator beam and whose modulation corresponds to the modulation of the signal beam.

For an optimum transmission of this modulation it is necessary that the states of polarisation of the signal beam and of the local oscillator beam be equal. In order to achieve this, there are arranged in the radiation path of the local oscillator beam controllable elements to influence the state of polarisation, namely an element C rotating the state of polarisation, referred to as rotator for the sake of simplicity, and two linear birefringent elements A and B. The angle between the principal axes of the two elements A and B is 45°. The elements A and B are, for example, electro-optical crystals and the rotator C is, for example, a Faraday rotator or a circular birefringent element.

For the control of the elements to influence the state of polarisation use can be made of the fact that the opto-electric converter 40 provides a maximum output signal when an optimum adaptation of the states of polarisation of the signal beam and the local oscillator beam is obtained. By varying the adjustment of the controllable elements to influence the state of polarisation alternately and in small steps by means of the control circuit 50 and by aiming at a maximum output signal the adaptation of the local oscillator beam to the signal beam can be maintained at a substantially optimum value.

Instead of a single opto-electric converter 40, opto-electric converters can be arranged subsequent to each of the two outputs of the beam-combining element 30. The output signals can then be combined by means of a differential amplifier. In this case loss of signal radiation is limited to a minimum.

Figure 1B:
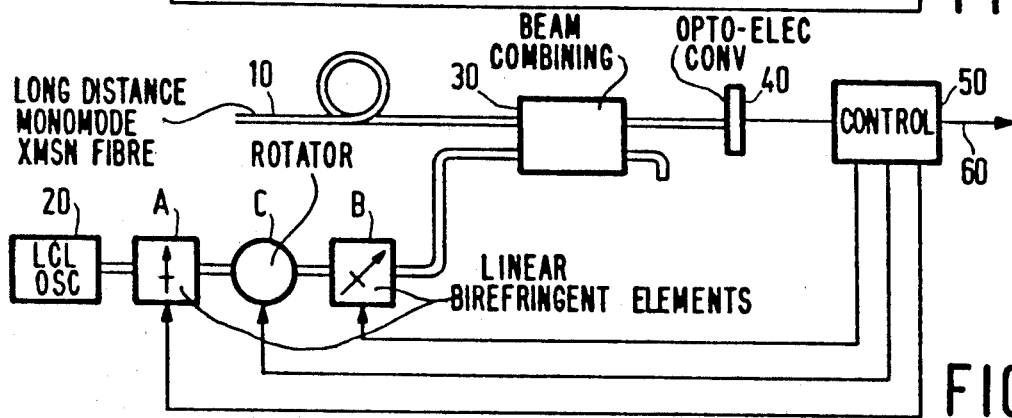
Figure 1C:
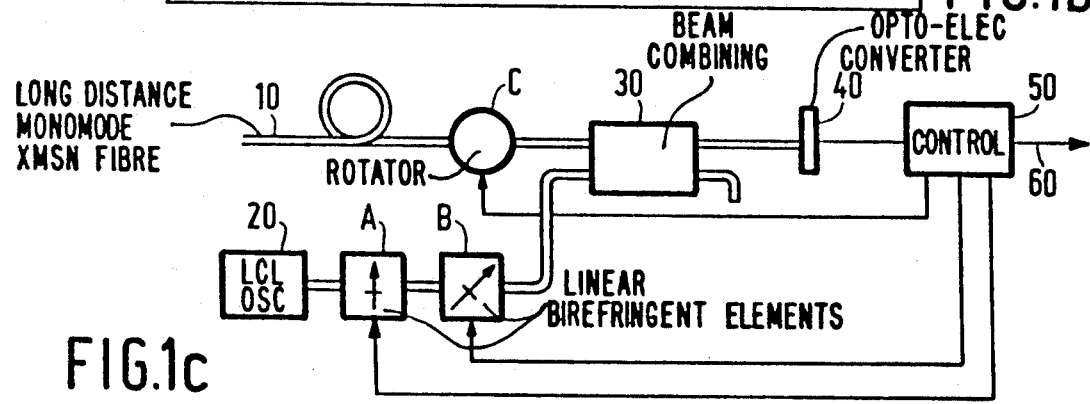
Figure 1D:
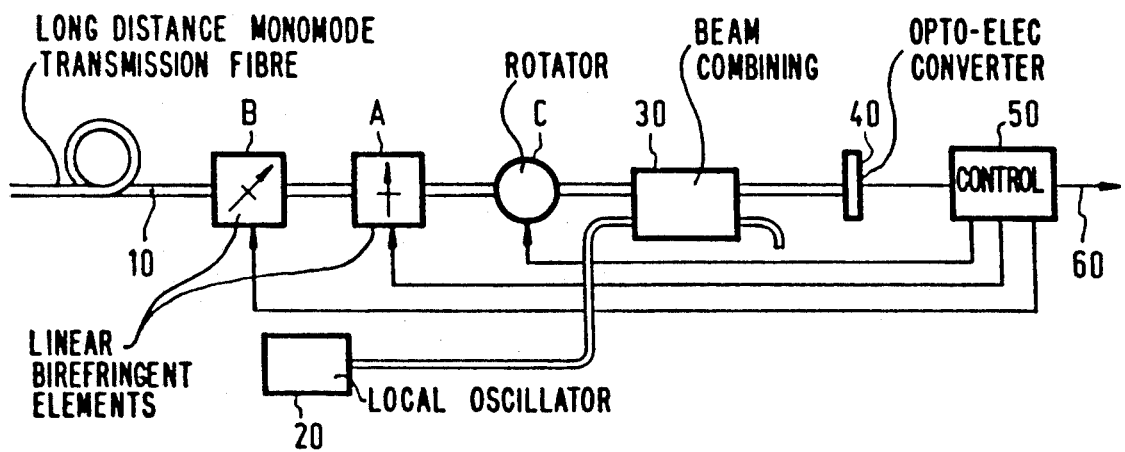

FIGS. 1b and 1c illustrate two further possible configurations. In FIG. 1b the rotator C is arranged between the two elements A and B and in FIG. 1c the rotator is arranged in the radiation path of the signal beam. The arrangement of the elements A, B and C in the radiation path of either the signal beam or the local oscillator beam is optional due to the reciprocity of the optical radiation path, provided that the mirror effect which may exist with respect to the beam-combining element 30 is taken into account. An embodiment with all three elements arranged in the radiation path of the signal beam is shown in FIG. 1d.

Figure 2A:
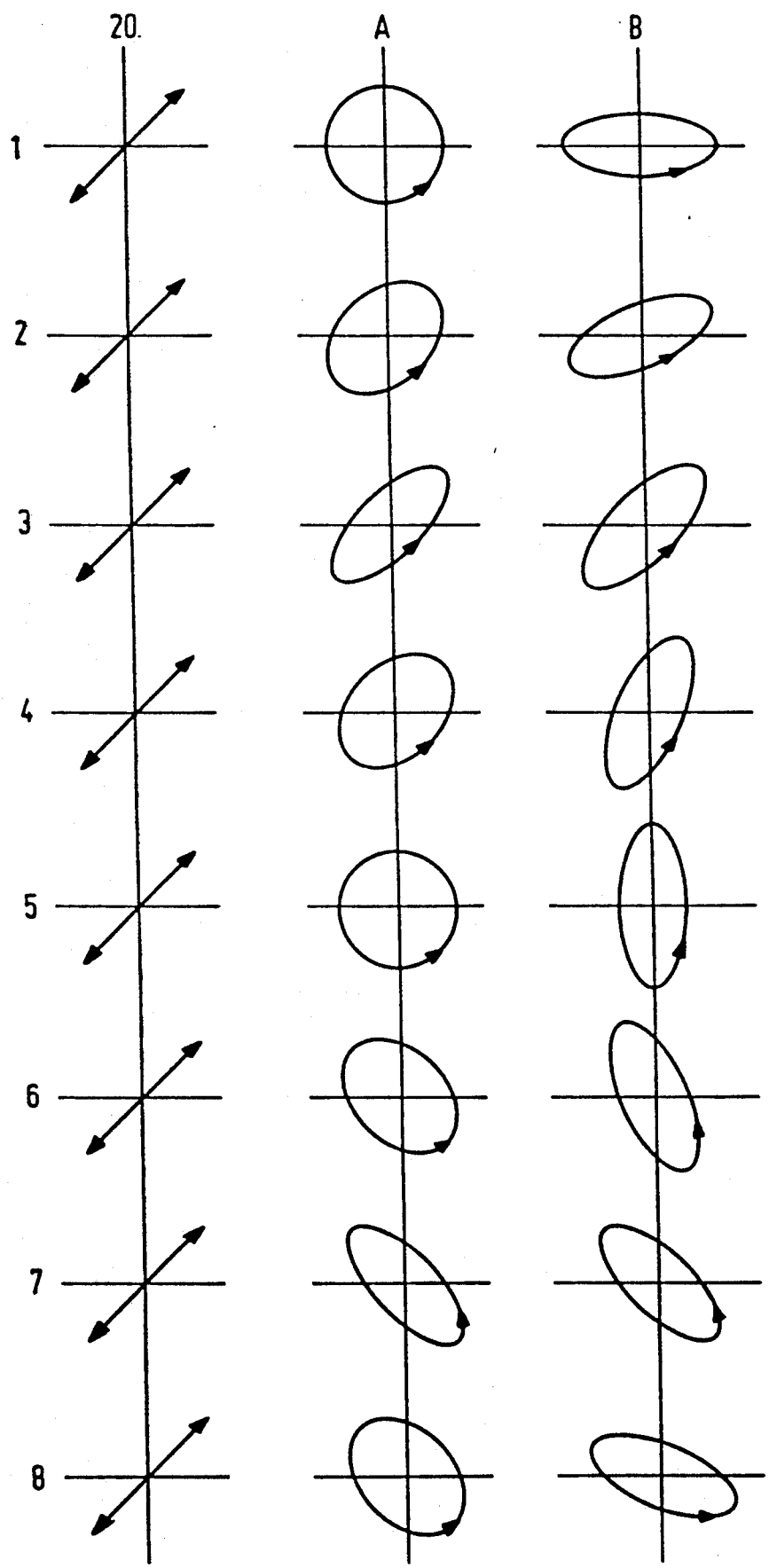
FIGS. 2a and 2b illustrate how a rotating and a deforming state of polarisation of the signal beam can be followed with the embodiments shown in FIGS. 1a, 1b and 1c.

FIG. 2a illustrates how the local oscillator beam can be brought to an elliptic state of polarisation by using the two elements A and B each having a limited control range, whilst the ellipticity remains equal but the major axis of the ellipse rotates. For the purpose of orientation the principal axes of A are horizontally and vertically directed and the principal axes of B are diagonally directed. The state of polarisation of the local oscillator beam is shown in the second and third columns after this beam has traversed the elements A and B, respectively.

The local oscillator 20 emits a linearly polarised radiation beam whose polarisation direction extends at an angle of 45° to the principal axes of the element A. As is illustrated in the upper row of FIG. 2a the element A introduces a phase difference of $\pi/2$ between the linear polarisation components of the beam so that the radiation emerging from the element A is circularly polarised. The phase difference which is caused by B between the linear polarisation components of the beam directed parallel to its principal axes results in the beam emerging from B being elliptically polarised whilst the major axis of the polarisation ellipse is vertically directed or, as in the Figure, horizontally.

A change of the adjustment of the element A brings the beam emerging from A to an elliptic state of polarisation with the ellipse axes extending at an angle of 45° to the principal axes of the element A. As is illustrated in the second row of FIG. 2a a simultaneous and coordinated reduction of the phase difference brought about by the two elements A and B results in the state of polarisation at the output of the element B remaining elliptical, whilst the ellipticity is equal to the original one, but the direction of the major axis is slightly rotated.

As is illustrated in the third row, a further coordinated reduction of the phase difference in the elements A and B results in a state of polarisation for the beam emerging from the element B whose ellipticity is completely determined by the adjustment of the element A and the direction of the major axis of the polarisation ellipse extends at an angle of 45° to the principal axes of the element A.

By causing the phase difference in A to increase again and that in B to further decrease, the major axis of the polarisation ellipse of the local oscillator beam is vertically directed at the output of the element B (rows 4 and 5) when the ellipticity remains equal. A further increase of the phase difference in the element A and also an increase of the phase difference in the element B brings about a further rotation of the major axis of the polarisation ellipse through 45° as is shown in the sixth and seventh rows of FIG. 2a. Finally, as is shown in the last row, the major axis of the polarisation ellipse can be brought to the horizontal direction by a reduction of the phase difference in the element A and a further increase of the phase difference in the element B.

The major axis of the ellipse is thus rotated through 180° and the adjustments of the elements A and B are equal to those of the initial situation. The use of the rotator C is consequently unnecessary in this case. The continuous rotation of the polarisation ellipse is brought about because the phase difference introduced by the elements A and B between the linear polarisation components which are parallel directed to the distinctive principal axes oscillate around a central value with the maximum deviation from the central value of the phase difference in one element taking place simultaneously with the crossing through the central value of the phase difference in the other element.

Figure 2B:
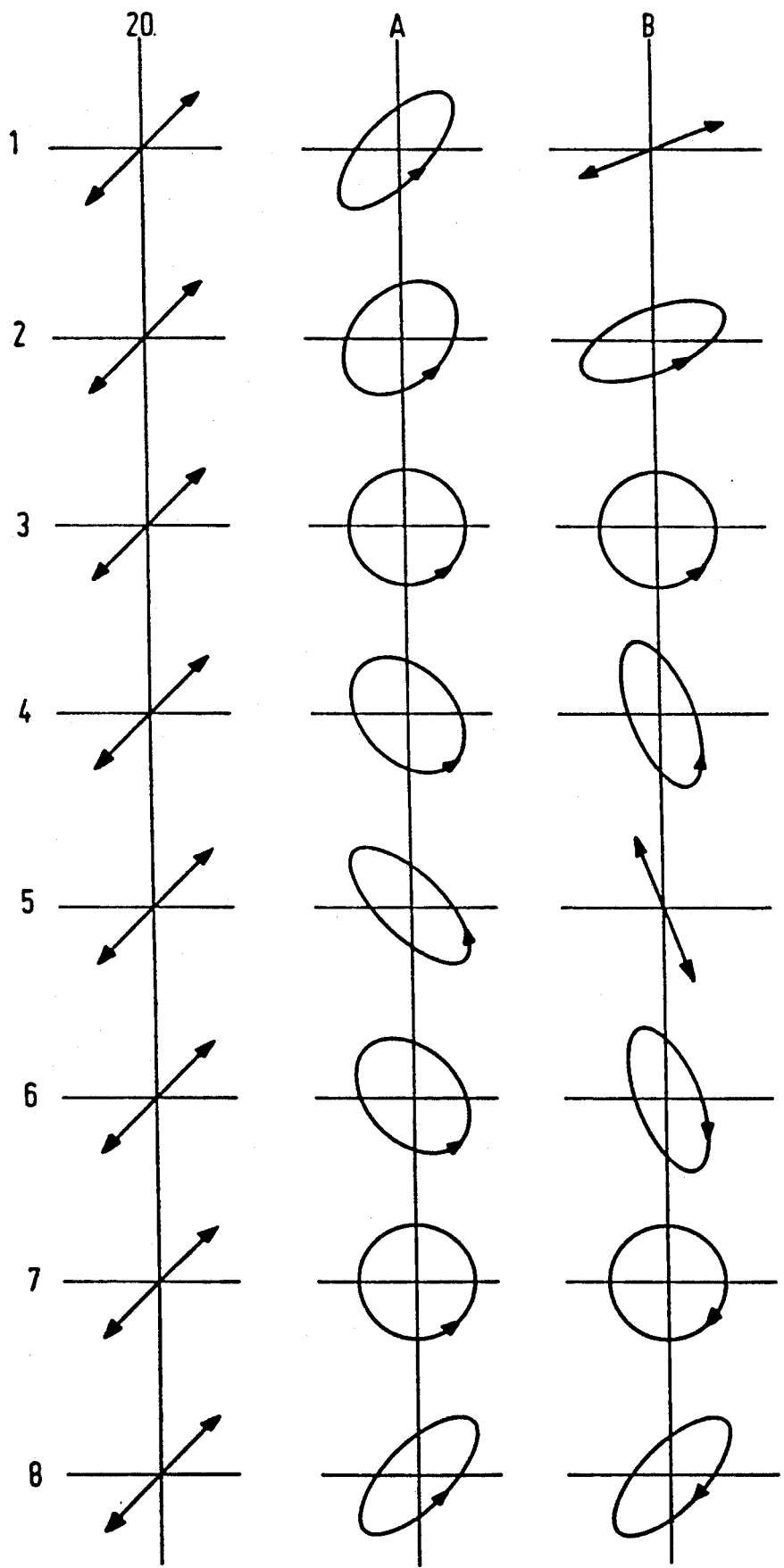

Analogously as in FIG. 2a, FIG. 2b shows how a deforming state of polarisation of the signal beam can be followed by means of the two elements A and B, with an arbitrary linear state of polarisation of the signal beam changing lefthanded elliptically, lefthanded circularly and again lefthanded elliptically into a linear state of polarisation which is orthogonal with respect to the initial state and subsequently changing righthanded elliptically, righthanded circularly and again righthanded elliptically into a state of polarisation corresponding to the initial state.

As in the case of the rotating polarisation ellipse, the phase difference caused by the element A between the two linear polarisation components corresponding to the principal axes produces an oscillation around a central state in this series of diagrams. As is shown in the diagrams drawn one below the other, however, the phase difference in the element B at the end of the cycle differs $2\pi$ from the phase difference in that element at the commencement of the cycle. In order to provide the possibility of endless control it must be possible to correct this by resetting the element B through $2\pi$.

Figure 3A:
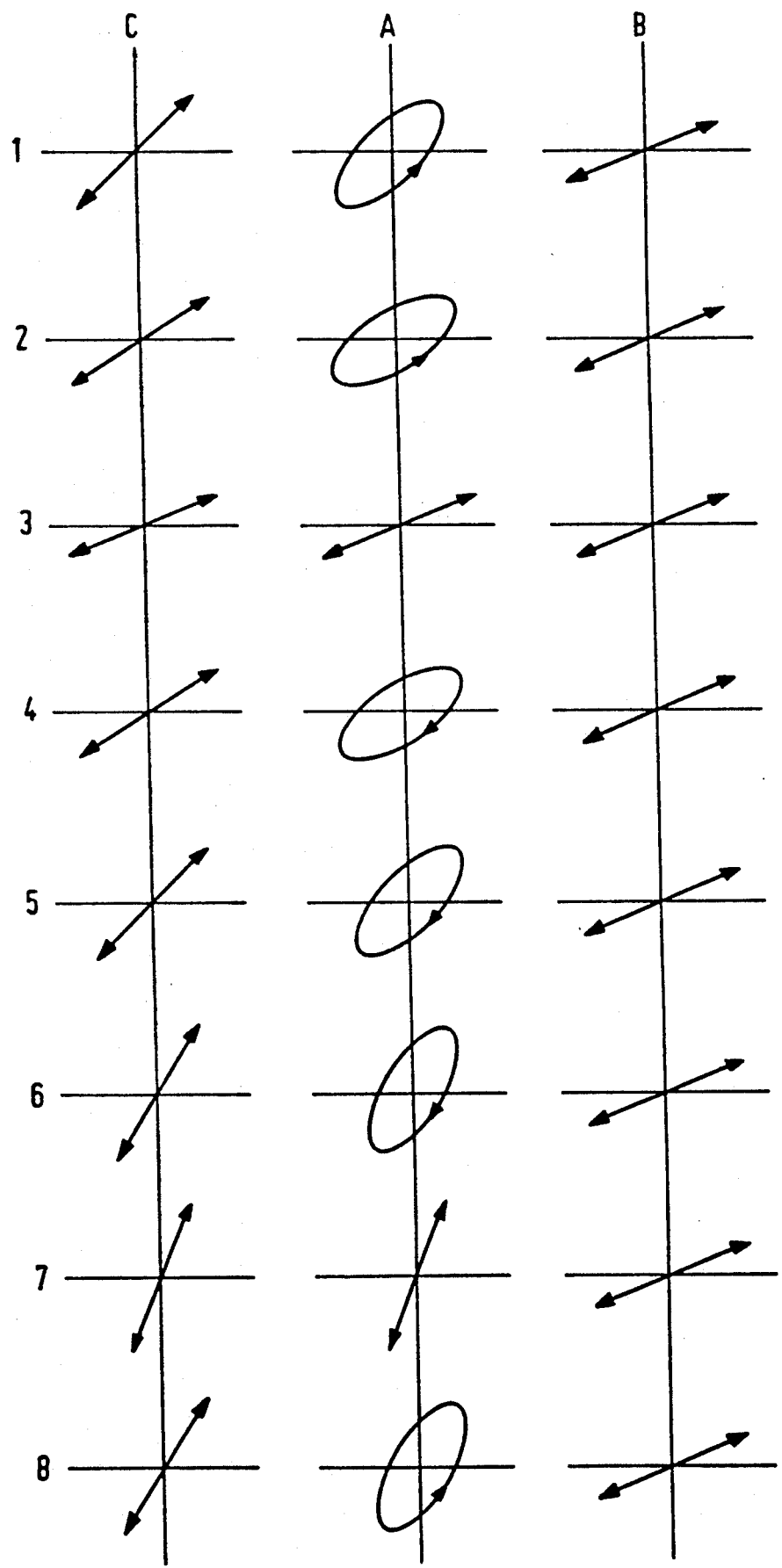
FIGS. 3a, 3b and 3c illustrate how the phase difference caused by a linear birefringent element can be modified by $2\pi$.
Figure 3B:
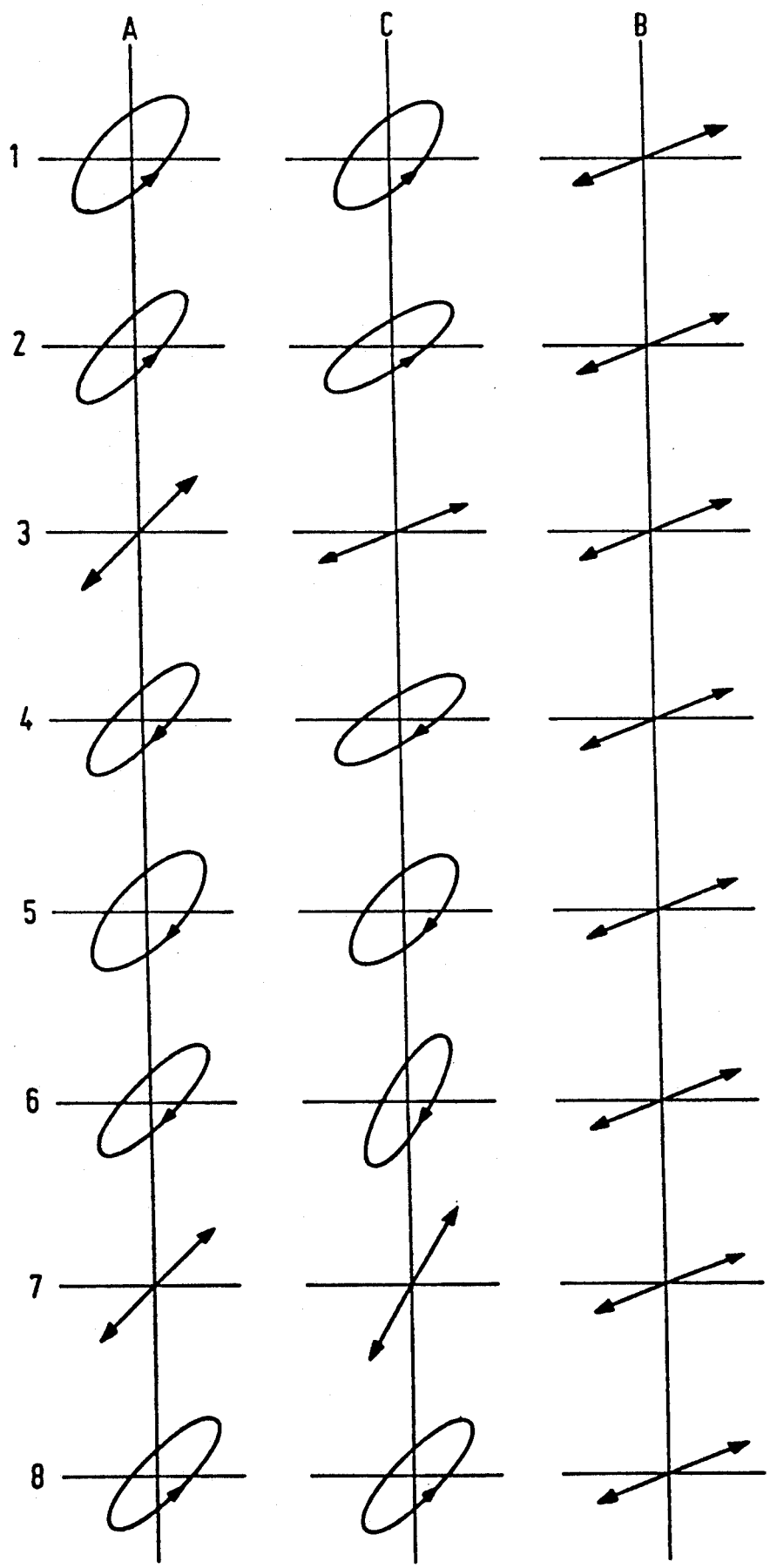

FIG. 3a shows in which way this resetting can be performed in the case of the rotator C being present between the local oscillator and the element A. This is shown in FIG. 3b for the situation in which the rotator is present between the elements A and B and in FIG. 3c for the case in which the rotator C is arranged subsequent to the element B. These three schemes correspond to the devices as shown in FIGS. 1a, 1b and 1c, respectively. When resetting element B the fact is utilized that, during a deformation cycle, there are phases at which the signal beam is linearly polarised.

In FIG. 3a the polarisation direction of the linearly polarised local oscillator beam is varied at that instant by means of the rotator C and the adjustment of the element A is also changed. As is shown in the consecutive rows of FIG. 3a both variations are oscillations around a central state in which the angular rotation in the rotator C has a sinesoidal variation and the phase difference in the element A has a cosinusoidal variation. In order to maintain the ultimate polarisation linear and in the same direction, the phase difference existing between the two principal axes of the element B must change simultaneously. This is effected in such a manner that after finishing the cycle the total change in phase difference is ultimately $2\pi$. The element B can thus be reset in this manner.

Figure 3C:
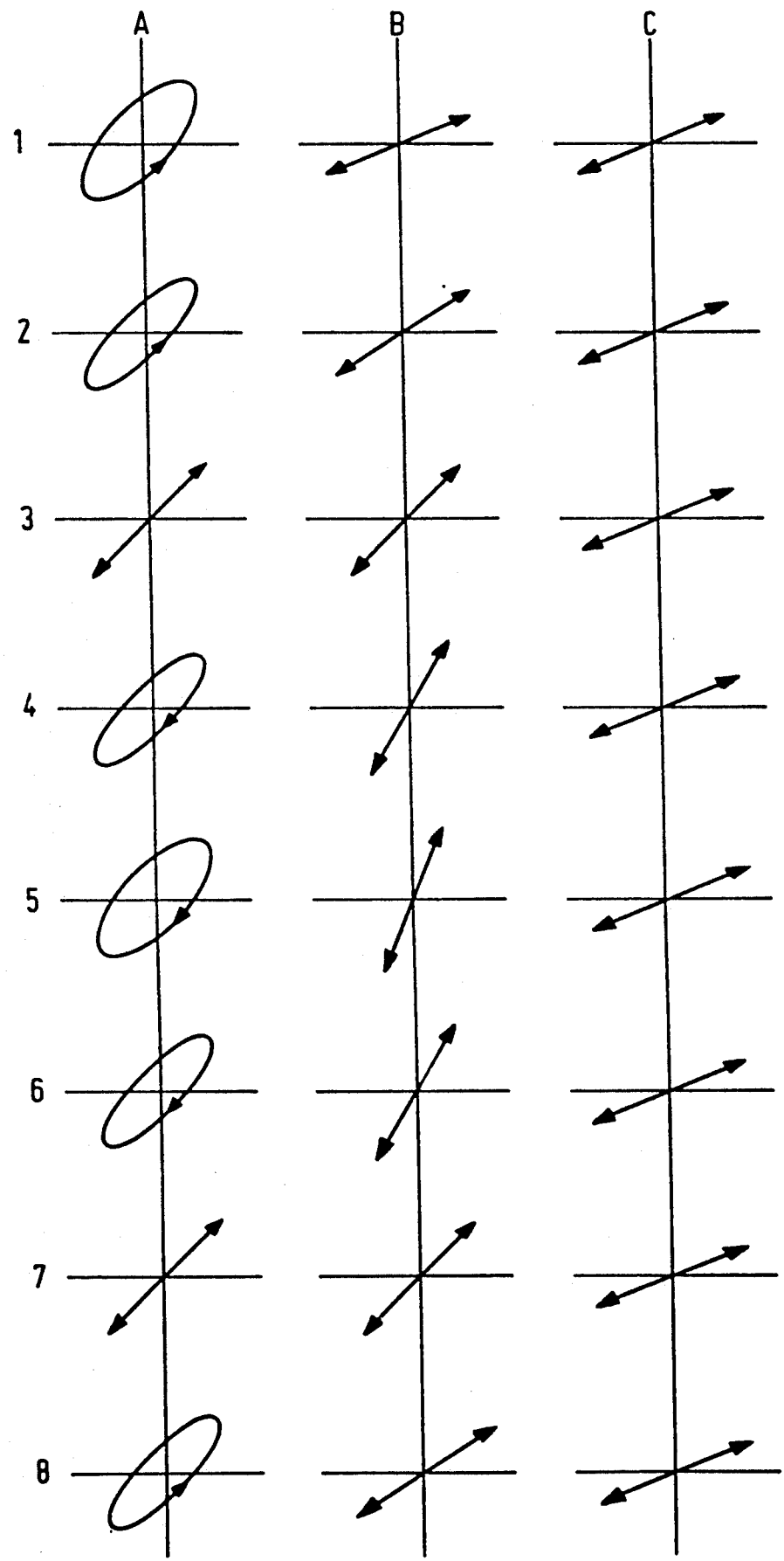

Correspondingly, FIGS. 3b and 3c illustrate how the phase difference in the element B can be changed by $2\pi$ by simultaneous and coordinated variation of the phase difference in the element A and the angular rotation by the rotator C, both over a limited range. It is possible to choose the task division between the two elements A and B to be different, more specifically in such a manner that it must be possible for the element A to change through $2\pi$.

Figure 4:
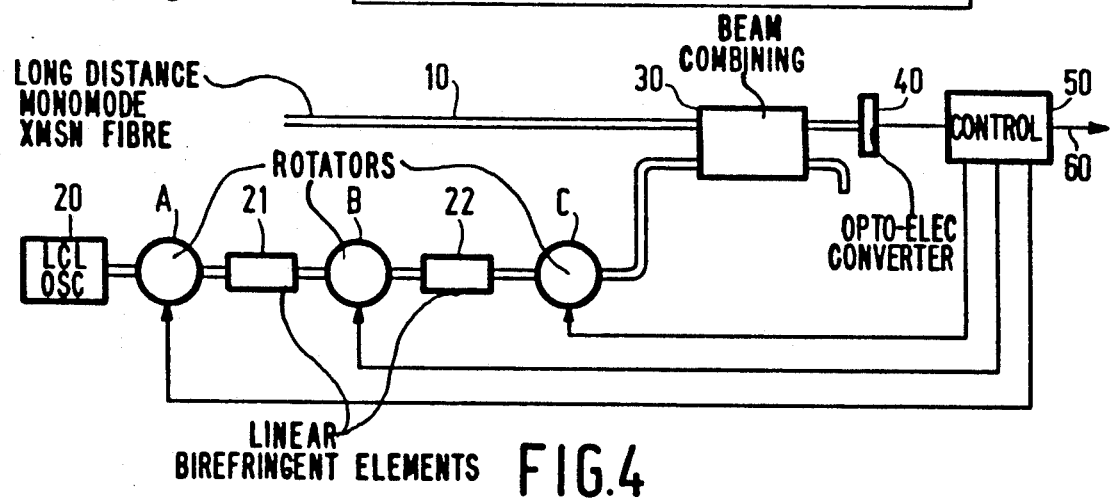
FIG. 4 shows diagrammatically an embodiment of a device according to the invention in which only elements rotating the state of polarisation are arranged as controllable elements to influence the state of polarisation.

FIG. 4 shows diagrammatically a device according to the invention. As in FIG. 1a, the reference numeral 10 denotes an optical transmission fibre through which a signal beam is propagated. The reference numeral 20 denotes a local oscillator and 30 denotes a beam-combining element. Radiation combined by the element 30 is detected by the opto-electric converter 40. Three controllable elements rotating the state of polarisation and having a limited control range A, B and C are arranged in the radiation path from the local oscillator beam to the beam-combining element 30. These elements may be, for example, Faraday rotators or circular birefringent crystals. For the sake of simplicity they are hereinafter referred to as rotators. Linearly birefringent elements 21 and 22, for example $\lambda/4$ plates or sections of linearly birefringent optical fibres are arranged between two successive rotators, which elements bring about a phase difference of $\pi/2$ between the two linearly polarised beam components parallel to the principal axes of the elements.

Figure 5A:
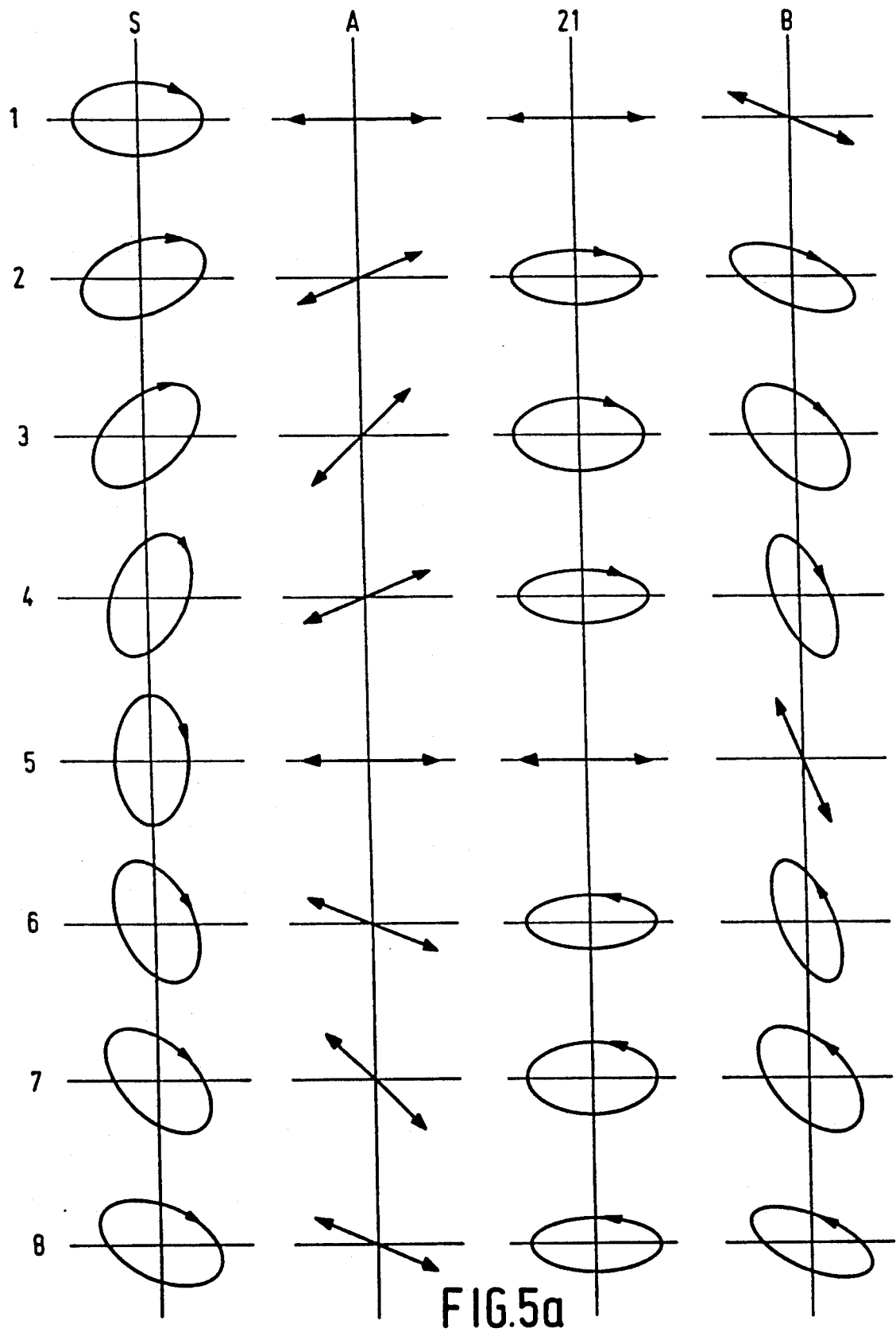
FIGS. 5a and 5b illustrate how modifying states of polarisation of the signal beam can be followed with the device of FIG. 4

FIG. 5a shows how in this embodiment the state of polarisation of the local oscillator beam can be adapted to the state of polarisation of the signal beam if the latter is elliptically polarised with an equal ellipticity and when the axes of the polarisation ellipse rotate. As in FIG. 2a this is illustrated with reference to a series of diagrams showing the states of polarisation at different instants and at different locations in the radiation path of the local oscillator beam. The principal axes of the birefringent elements 21 and 22 are arranged parallel to each other in the horizontal and vertical directions. The first column of FIG. 5a shows the state of polarisation of the signal beam and the other columns show the state of polarisation of the local oscillator beam after traversing the element whose designation is stated above the column.

In the first row of diagrams of FIG. 5a the axes of the polarisation ellipse of the signal beam are shown parallel to the principal axes of the elements 21 and 22 with the major axis being horizontal. The polarisation direction of the local oscillator beam is rotated by means of the rotator A in such a manner that it is parallel to the horizontal principal axis of the element 21. Thus, this element has no effect on the state of polarisation. The rotator B rotates the polarisation direction of the still linearly polarised local oscillator beam so that the radiation emerging from the second birefringent element is elliptically polarised to an equal extent as the signal beam.

In the case of a rotation of the state of polarisation the polarisation ellipse is rotated by a coordinated variation of the rotations brought about by the two rotators A and B. The angular rotation caused by each of the two rotators then oscillates around a central state which for the rotator A coincides with one of the principal axes of the birefringent element 21 and for the rotator B extends at an angle of 45° to these principal axes. In this coordinated variation the angular rotation by the one rotator assumes its central state at the instant when the other rotator reaches its maximum deflection from the central state. The third rotator C is not used in this case.

Figure 5B:
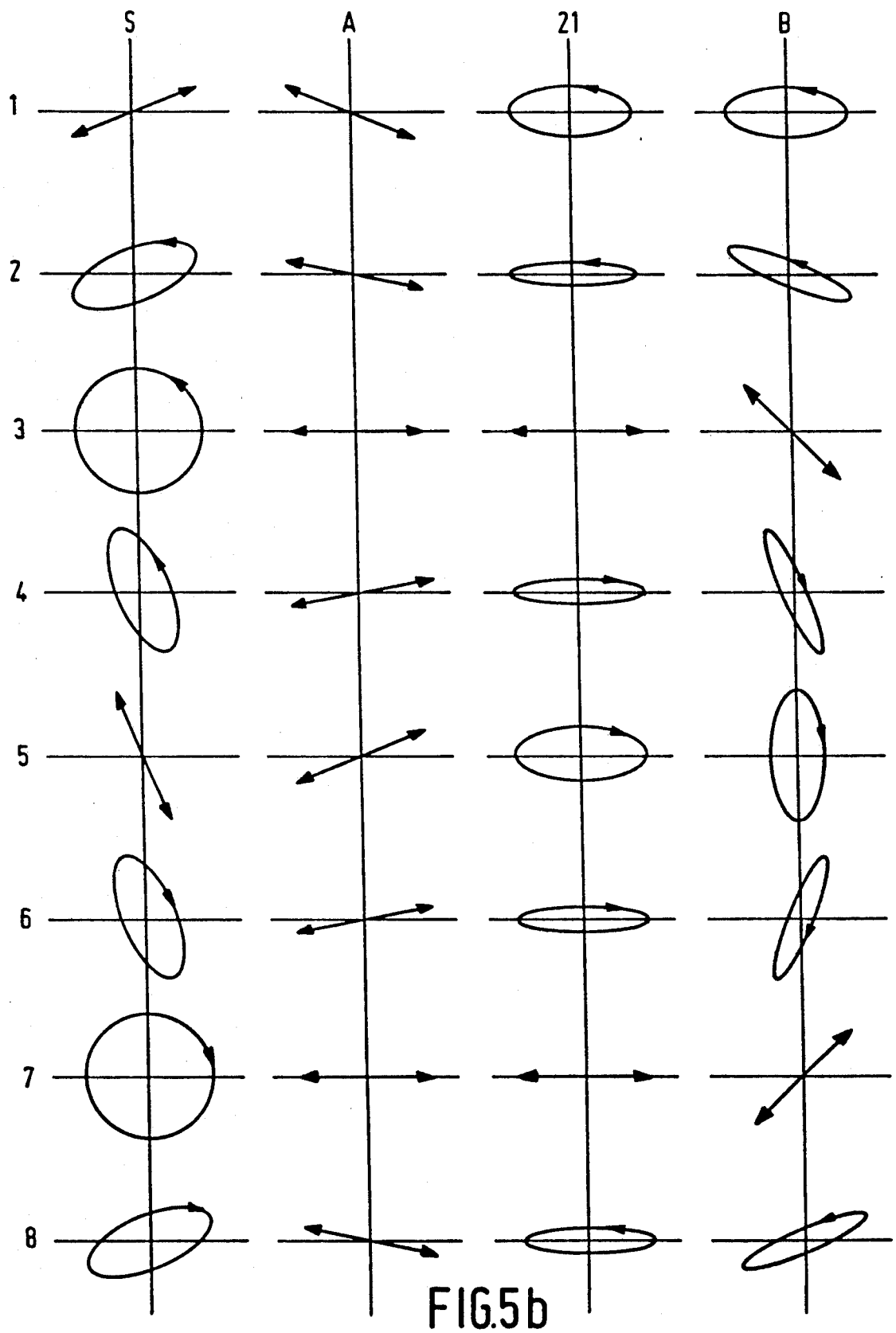

FIG. 5b shows analogously to FIG. 5a how the state of polarisation of the signal beam can be followed when it deforms from a linear state of polarisation via lefthanded elliptical, circular and again elliptical states of polarisation to an orthogonal linear state of polarisation and subsequently via righthanded elliptical states of polarisation to the initial state.

The upper row shows the initial state. The signal is linearly polarised and the polarisation direction extends at an angle $\theta$ to the horizontal principal axes of the birefringent elements 21 and 22. The rotator A rotates the polarisation direction of the linearly polarised local oscillator beam until it extends at an angle $-\theta$ to the horizontal principal axis of element 21. Since this element brings about a phase difference of $\pi/2$ between the horizontal and vertical states of polarisation of the local oscillator beam, a lefthanded ellipse results at the output of element 21. The rotator B does not rotate the state of polarisation and after traversing of the birefringent element 22 the state of polarisation of the local oscillator beam is linear again and the polarisation direction extends at an angle $+\theta$ to the horizontal principal axes of the elements 21 and 22.

A small deformation of the signal beam means that the state of polarisation is, for example lefthanded, elliptical, whilst the major axis of the ellipse still extends at an angle $\theta$ to the horizontal principal axes of the elements 21 and 22. The rotator A rotates the polarisation direction of the local oscillator to a smaller angle with respect to the horizontal axis so that the birefringent element 21 converts the state of polarisation to a narrower ellipse. This ellipse is rotated by the rotator B and is deformed to the desired state of polarisation by the second birefringent element 22. In a corresponding manner the entire variation of the deformation can be described. Likewise as for a rotating state of polarisation of the signal beam, the rotation of the local oscillator beam by the rotator A can now remain limited to an oscillation between two limits. However, at each complete deformation cycle the angle through which the rotator B must rotate the state of polarisation increases by 180° so that B reaches the limit of its control range after a few cycli.

Figure 6:
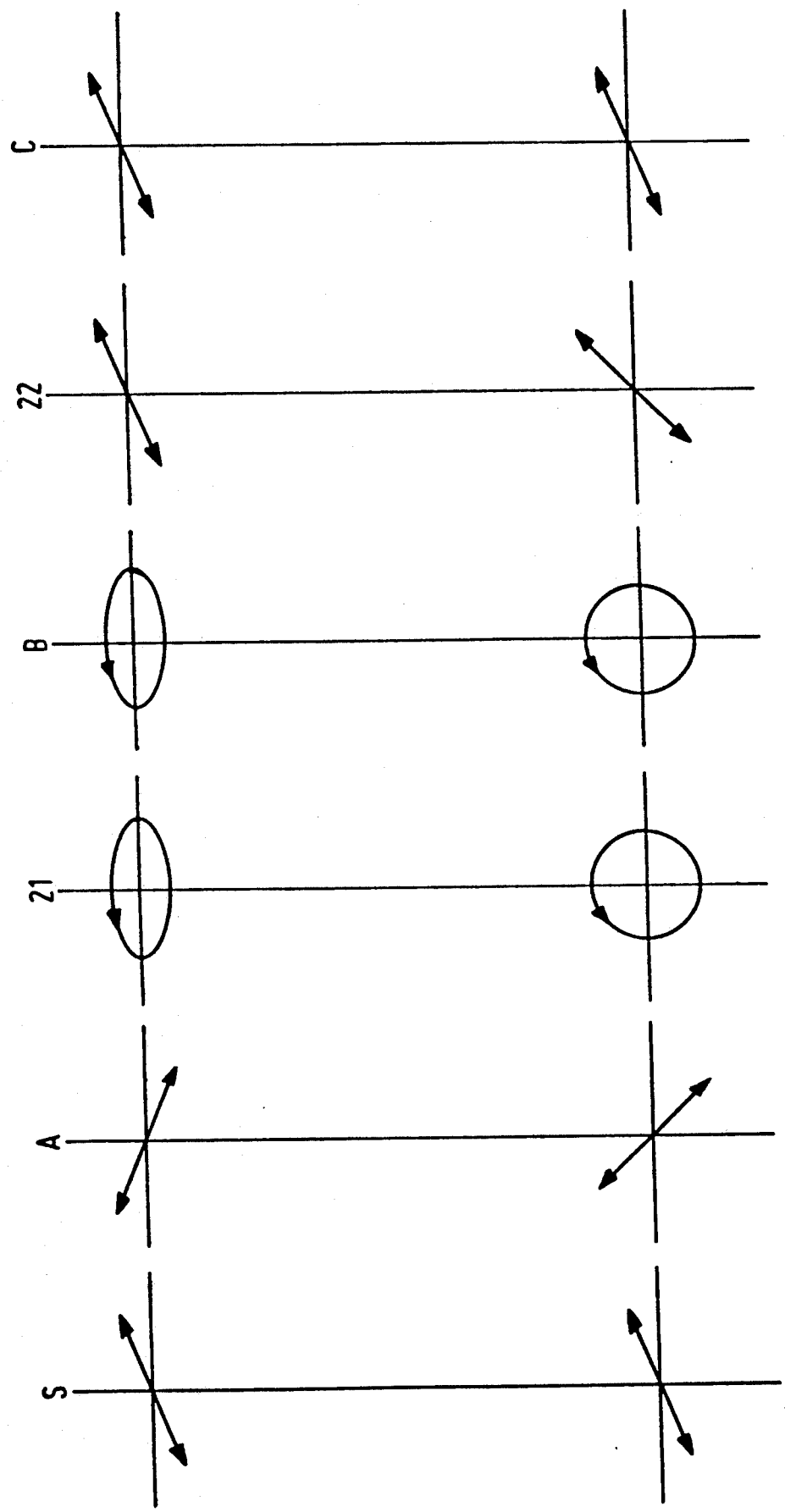
FIG. 6 illustrates a resetting of the angular rotation of one of the elements rotating the state of polarisation through 180°.

By utilising the fact that linearly polarised states of the signal beam occur during a complete deformation cycle, the rotator B can be reset through 180° or a multiple thereof without consequences for the state of polarisation of the local oscillator beam. This is illustrated in FIG. 6. The angle at which the linearly polarised local oscillator beam extends to the principal axes of the birefringent element 21 is brought to 45° by the rotator A. The beam emerging from the element 21 is thus circularly polarised so that the rotator B no longer has any influence on this state of polarisation. The beam is converted by the second birefringent element 22 to a linearly polarised beam whose polarisation direction extends at an angle of 45° to the principal axes of said element. With the aid of the rotator C the polarisation direction of the local oscillator beam is rendered equal to that of the signal beam. Since in this situation the rotator B no longer has any influence on the state of polarisation, the angular rotation brought about by element B can be changed by an arbitrary multiple of 180°.

It will be evident to those skilled in the art that other schemes of the task division among the three rotators can be used. It will also be evident that as a result of the reciprocity of the radiation path the rotators and the birefringent elements 21 and 22, whilst taking the sequence into account, can be arranged in different manners in the radiation paths of the local oscillator beam and the signal beam.

What is claimed is:

1. A device for optical heterodyne detection of an input signal in the form of an optical beam of radiation having a varying state of polarization, such device comprising:
   a. a local oscillator for generating a polarized beam of radiation having a state of polarization;
   b. means for combining said local oscillator radiation with said input signal radiation to form a beam of combined radiation which includes said input signal radiation;
   c. an electro-optical converter for converting said beam of combined radiation into an electrical signal, so that the device achieves non-diversity detection of said input signal;
   d. a plurality of not more than three controllable polarization influencing elements respectively coupled to the local oscillator radiation and/or the input signal radiation to influence the polarization state of such radiation, each such element having a limited control range of such polarization influencing effect, the control range limitations being such that none of said elements can influence the polarization state of the input signal radiation over any endless variation of such polarization state in any direction; and
   e. means for deriving from said electrical signal a plurality of control signals for controlling said polarization influencing elements so that any one of said elements is gradually readjustable within its control range, during which readjustment the polarization influence of said one element changes and the others of said elements provide a degree of polarization influence which continuously compensates for the changing polarization influence of said one element;
   whereby the polarization state of said input signal radiation included in said combined beam is continuously controlled relative to the polarization state of said local oscillator radiation despite the limited control ranges of said polarization influencing elements.

2. The device of claim 1 wherein at least one of the controllable polarization influencing elements is a linear birefringent element.

3. The device of claim 1 wherein at least one of the controllable polarization influencing elements is an element for rotating the state of polarization of the radiation to which it is coupled.

4. The device of claim 1 wherein all of the controllable polarization influencing elements are coupled to the local oscillator radiation to influence the polarization state thereof.

5. The device of claim 1 wherein all of the controllable polarization influencing elements are coupled to the input signal radiation to influence the polarization state thereof.

6. The device of claim 1 further comprising at least one non-controllable polarization influencing element for influencing the polarization of either the local oscillator radiation or the input signal radiation.

7. The device of claim 1 comprising exactly three controllable polarization influencing elements.

8. An optical transmission system comprising a device for optical heterodyne detection of an input signal in the form of an optical beam of radiation having a varying state of polarization, said detection device comprising:

a. a local oscillator for generating a polarized beam of radiation having a state of polarization;

b. means for combining said local oscillator radiation with said input signal radiation to form a beam of combined radiation which includes said input signal radiation;

c. an electro-optical converter for converting said beam of combined radiation into an electrical signal, so that the device achieves non-diversity detection of said input signal;

d. a plurality of not more than three controllable polarization influencing elements respectively coupled to the local oscillator radiation and/or the input signal radiation to influence the polarization state of such radiation, each such element having a limited control range of such polarization influencing effect, the control range limitations being such that none of said elements can influence the polarization state of the input signal radiation over more than a portion of any endless variation of such polarization state in any direction; and e. means for deriving from said electrical signal a plurality of control signals for controlling said polarization influencing elements so that any one of said elements is gradually readjustable within its control range, during which readjustment the polarization influence of said one element changes and the others of said elements provide a degree of polarization influence which continuously compensates for the changing polarization influence of said one element;

whereby the polarization state of said input signal radiation included in said combined beam is continuously controlled relative to the polarization state of said local oscillator radiation despite the limited control ranges of said polarization influencing elements.

9. The device of claim 8 wherein at least one of the controllable polarization influencing elements is a linear birefringent element.

10. The device of claim 8 wherein at least one of the controllable polarization influencing elements is an element for rotating the state of polarization of the radiation to which its is coupled.

11. The device of claim 8 wherein all of the controllable polarization influencing elements are coupled to the local oscillator radiation to influence the polarization state thereof.

12. The device of claim 8 wherein all of the controllable polarization influencing elements are coupled to the input signal radiation to influence the polarization state thereof.

13. The device of claim 8 further comprising at least one non-controllable polarization influencing element for influencing the polarization of either the local oscillator radiation or the input signal radiation.

14. The device of claim 8 comprising exactly three controllable polarization influencing elements.

15. A device for optical heterodyne detection of an optical signal beam from input signal radiation having a varying state of polarization, the device comprising:

a. a local oscillator for generating a polarized beam of local oscillator radiation, the local oscillator radiation having a state of polarization;

b. means for combining said local oscillator radiation with said input signal radiation to form a beam of combined radiation which includes said signal beam;

c. an electro-optical converter for converting said beam of combined radiation to an electrical signal, whereby the device achieves non-diversity detection;

d. at most three controllable polarization influencing elements, respective controllable polarization influencing elements being coupled to influence the local oscillator radiation and/or the input signal radiation, the controllable polarization influencing elements having respective limited control ranges, which ranges are limited such that none of the controllable polarization influencing elements has a respective control range large enough to compensate for any endless variation in the varying state of polarization of the input signal radiation; and e. means for deriving from said electrical signal a plurality of control signals for controlling said controllable polarization influencing elements, so that, in said beam of combined radiation, the state of polarization of said signal beam is endlessly controlled relative to the state of polarization of said local radiation.

16. An optical transmission system comprising: a device for optical heterodyne detection of an optical signal beam from input signal radiation having a varying state of polarization, the device comprising:

a. a local oscillator for generating a polarized beam of local oscillator radiation, the local oscillator radiation having a state of polarization;

b. means for combining said local oscillator radiation with said input signal radiation to form a beam of combined radiation which includes said signal beam;

c. an electro-optical converter for converting said beam of combined radiation to an electrical signal, whereby the device achieves non-diversity detection;

d. at most three controllable polarization influencing elements, respective controllable polarization influencing elements being coupled to influence the local oscillator radiation and/or the input signal radiation, the controllable polarization influencing elements having respective limited control ranges, which ranges are limited such that none of the controllable polarization influencing elements has a respective control range large enough to compensate for any endless variation in the varying state of polarization of the input signal radiation; and e. means for deriving from said electrical signal a plurality of control signals for controlling said controllable polarization influencing elements, so that, in said beam of combined radiation, the state of polarization of said signal beam is endlessly controlled relative to the state of polarization of said local radiation.

* * * * *